United States Patent
Lemon (10) Patent No.: US 7,602,379 B2
(45) Date of Patent: Oct. 13, 2009

(54) DIGITAL ANNOTATOR

(75) Inventor: Michael J. Lemon, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 274 days.

(21) Appl. No.: 09/884,549

(22) Filed: Jun. 19, 2001

(65) Prior Publication Data

US 2002/0190965 A1    Dec. 19, 2002

(51) Int. Cl.
*G06F 3/041* (2006.01)
*G06F 3/033* (2006.01)

(52) U.S. Cl. .................. 345/173; 345/179; 178/18.01; 178/18.03; 178/19.01

(58) Field of Classification Search ......... 345/173–184, 345/863, 157; 715/863, 825, 760, 512; 709/219; 455/550; 178/18.01–19.07
See application file for complete search history.

(56) References Cited

U.S. PATENT DOCUMENTS

| | | | | | |
|---|---|---|---|---|---|
| 4,633,436 | A | * | 12/1986 | Flurry | 345/179 |
| 5,592,607 | A | * | 1/1997 | Weber et al. | 345/863 |
| 5,629,499 | A | | 5/1997 | Flickinger et al. | 178/18 |
| 5,680,636 | A | * | 10/1997 | Levine et al. | 715/512 |
| 5,734,882 | A | * | 3/1998 | Lopresti et al. | 707/200 |
| 5,815,830 | A | * | 9/1998 | Anthony | 707/6 |
| 6,002,853 | A | * | 12/1999 | de Hond | 709/219 |
| 6,018,591 | A | | 1/2000 | Hull et al. | 382/186 |
| 6,050,490 | A | | 4/2000 | Leichner et al. | 235/462.49 |
| 6,057,845 | A | * | 5/2000 | Dupouy | 345/863 |
| 6,091,409 | A | * | 7/2000 | Dickman et al. | 345/847 |
| 6,144,380 | A | * | 11/2000 | Shwarts et al. | 715/863 |
| 6,219,679 | B1 | * | 4/2001 | Brisebois et al. | 715/501.1 |
| 6,330,976 | B1 | * | 12/2001 | Dymetman et al. | 235/487 |
| 6,373,473 | B1 | * | 4/2002 | Sakaguchi et al. | 345/173 |
| 6,456,307 | B1 | * | 9/2002 | Bates et al. | 345/838 |
| 6,525,716 | B1 | * | 2/2003 | Makino | 345/173 |
| 6,526,424 | B2 | * | 2/2003 | Kanno et al. | 715/512 |
| 6,697,838 | B1 | * | 2/2004 | Jakobson | 709/203 |
| 6,738,053 | B1 | * | 5/2004 | Borgstrom et al. | 345/179 |
| 6,766,494 | B1 | * | 7/2004 | Price et al. | 715/513 |
| 6,820,111 | B1 | * | 11/2004 | Rubin et al. | 709/203 |
| 6,877,137 | B1 | * | 4/2005 | Rivette et al. | 715/512 |
| 7,091,959 | B1 | * | 8/2006 | Clary | 345/173 |
| 2002/0077143 | A1 | * | 6/2002 | Sharif et al. | 455/550 |

OTHER PUBLICATIONS

Arai, et al., PaperLink: A Technique for Hyperlinking from Real Paper to Electronic Content, CHI 97 Electronic Publications: Papers; Proceedings of the ACM Conference on Human Factors in Computing Systems pp. 327-334.

(Continued)

*Primary Examiner*—Spilakshmi K Kumar (57) ABSTRACT

A method and apparatus for creating and using temporary electronic bookmarks, such as those associated with a web browser, uses a digitizer tablet with an inking pen (or stylus). An end-user created symbol on the tablet, in terms of Cartesian coordinates position, is associated contemporaneously with a specific electronically addressable site as a temporary label for the site's address. A set of created symbols is then used as a current index into a data structure that holds the associated value related to the web site, allowing the user to jump between annotated sites using the created symbols. Other data retrieval uses are described.

17 Claims, 9 Drawing Sheets

OTHER PUBLICATIONS

Whittaker et al., Filochat:Handwritten Notes Porvide Access to Recorded Conversations, Apr. 1994, Proceedings of the ACM Conference on Human Factors In Computing Systems (Chicago 1994), pp. 271-277.

Siio et al., Real-world Interaction using the FieldMouse, 1999, Proceedings of the ACM Symposium on User Interface Software and Technology, UIST '99.

Briklin, http://www.bricklin.com, Sony eMarker:How a Clever System Works, copr. 1999-2001.

News Wacom, Wacom Introduces Low-cost Graphire Inking Pen Set for Signature Capture and Recognition Applications, Sep. 5, 2000.

IBM, New CrossPad XP Offers a Lightweight Design with Heavyweight Features and Functionality, Sep. 28, 1998.

Sii, Seiko Instruments Inc., SmartPad The Connected Notepad, Take notes. Draw. Write the way you want to write (undated).

* cited by examiner

DIGITAL ANNOTATOR

CROSS-REFERENCE TO RELATED APPLICATIONS

Not Applicable.

STATEMENT REGARDING FEDERALLY SPONSORED RESEARCH OR DEVELOPMENT

Not Applicable.

REFERENCE TO AN APPENDIX

Not Applicable.

BACKGROUND OF THE INVENTION

1. Field of the Invention

The present invention relates generally to computers and computer peripheral devices and, more specifically, to a writing device which functions as a tablet for temporarily bookmarking information.

2. Description of Related Art

Figure 1:
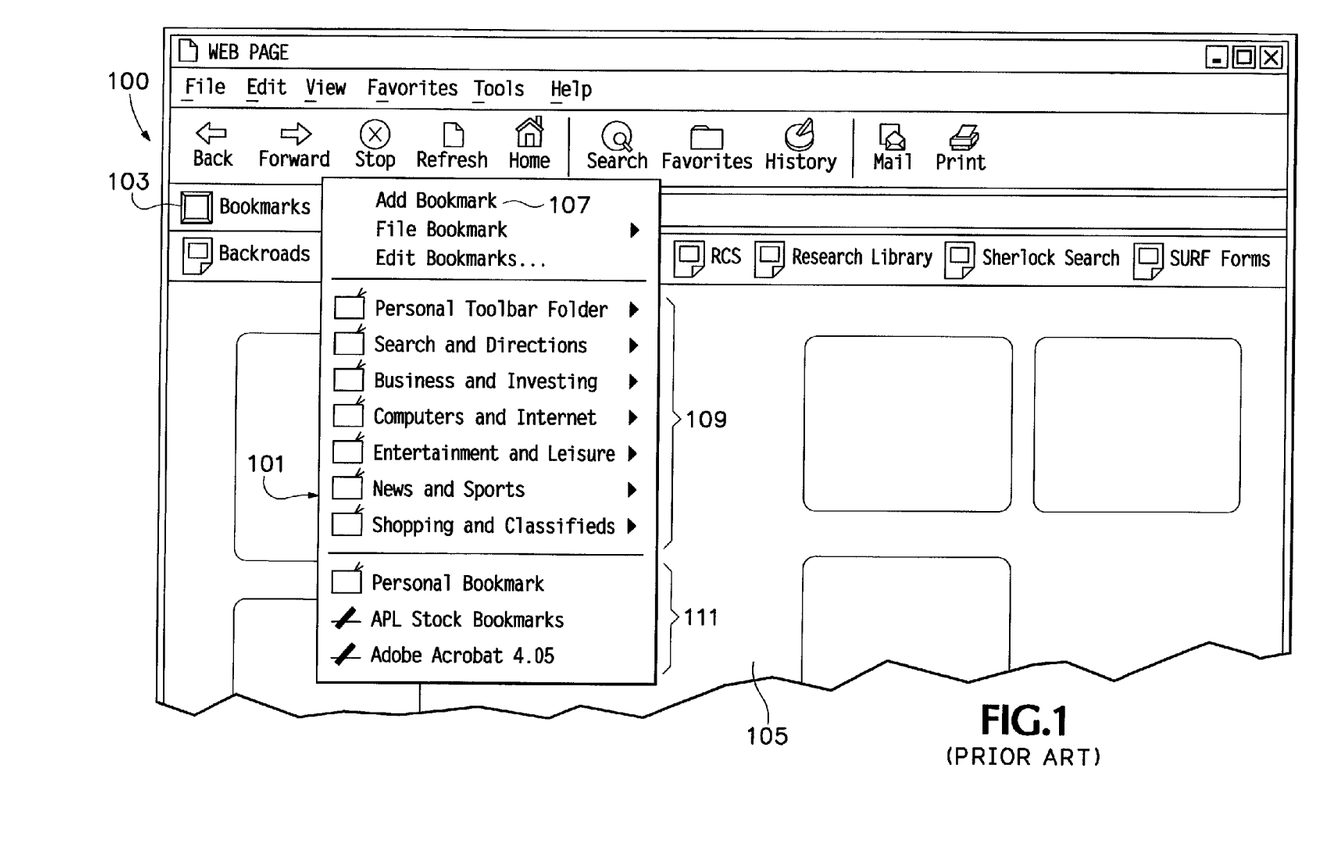
FIG. 1 (Prior Art) is a typical web browser screen demonstrating the bookmarking function.

As shown in FIG. 1 (Prior Art), internet access software—commonly known as a "web browser" (or more simple "browser")—includes a built-in "bookmarking" function. ("Internet" is used herein as a generic term for a collection of distributed, interconnected networks (ARPANET, DARPANET, World Wide Web, or the like) that are linked together by a set of industry standard protocols (e.g., TCP/IP, HTTP, UDP, and the like) to form a global, distributed network; it is also used as generic for proprietary intranets.) On the screen view 100, there is a drop-down window(s) feature 101 accessed by clicking on the "Bookmarks" iconic virtual button 103. This function is designed for the end-user's semi-permanent storage of web site addresses (known a Uniform Resource Locators (URL or URI or the like)). A user can add bookmarks to specific site page 105 currently in view by clicking on the "Bookmarks" virtual button 103, then clicking on the "Add Bookmark" virtual button 107 at the top of the drop-down list 101, whereby the current web site address, or a synonym associated therewith, is added to the list bottom 111. URLs saved in this manner can be repeatedly referenced in the current or future on-line sessions until specifically deleted by the user using a provided "Edit Bookmarks" feature.

An alternative to bookmarking is to open multiple windows, one for each site of interest, and to stack or tile the windows, shuffling between them as the user's current interest dictates. Multiple windowing is of course limited by the video screen dimensions.

One inherent problem with the browser's bookmarking system is that the length of the list soon exceeds the common screen height, requiring either sub-listing horizontally using virtual folders 109 which open further lists or scrolling the screen to find the particular bookmark of current interest. Another alternative to semipermanent browser bookmarking is to write the URL on a piece of paper and re-enter the address each time the site is to be visited; this is of course time consuming and subject to the frustrations attendant with keeping the paper, losing the paper, and repeating the search which discovered the site-of-interest in the first instance, if possible. Thus, there is a need for a system for creating temporary bookmarks for use only during a current on-line session.

Also, there is known in the art electronic devices compatible with handwriting. Examples of inventions assigned to the common assignee, incorporated herein by reference, include the following. U.S. Pat. No. 5,629,499 by Flickinger, et al. for an ELECTRONIC BOARD TO STORE AND TRANSFER INFORMATION describes a pen and a board, which has a sensing mechanism, a memory device and a communication link. When the pen imprints symbols to the board, the symbols are not concurrently electronically displayed; but, the symbols are detected by the sensing mechanism, stored in the memory device, and can later be transferred to an electronic device through the communication link. U.S. Pat. No. 6,018,591 by Hull et al. for SCRIBBLE MATCHING describes methods for searching samples of electronic ink without having first to translate the ink into ASCII text. In pen-based computer devices, the identification and encoding of velocity minima in the input scribble is provided. Three scribble matching algorithms are described—a syntactic matcher, a word matcher, and an elastic matcher. The syntactic matcher encodes the input scribble according to the shape of the scribble in the region of the velocity minima. The word matcher encodes the input scribble according to the heights of the velocity minima from a reference line, using a continuous height encoding scheme. The elastic matcher encodes the input scribble according to a classification of the velocity minima and intermediate points. The use of velocity minima in the encoding of scribble input provides a stable set of points and leads to improved performance in comparison with known scribble matching methods. U.S. Pat. No. 6,050,490 by Leichner et al. for a HANDHELD WRITING DEVICE AND RELATED DATA ENTRY SYSTEM describes a digital electronic clipboard used to mount pages or forms utilized in forms processing application, such as inventory tracking. A stylus having a writing tip at one end of the stylus and a bar code scanning mechanism at another end of the stylus is used to enter data on the pages or forms and scan bar codes appearing on the pages or forms themselves, or on a separate item to be associated with the form. The system detects whether bar code data or stylus position data is being generated and causes its CPU (central processing unit) to responsively process entered data.

Ink writing tablets associated with computing devices are also commercially available: e.g., the CrossPad™ digital notepad series by A. T. Cross Company of Lincoln, R.I.; the IBM™ ThinkPad™ TransNote™ laptop computer bundled with Ink Manager software; the Seiko Instruments SmartPad™ which works with a Palm Organizer personal digital assistant; and the Wacom™ Graphire tablet and inking pen (for signature capture, recognition and verification).

There is a need for a method of using ink writing tablets to facilitate computer search result indexing, adaptable to use with the Internet and other computerized functions.

BRIEF SUMMARY OF THE INVENTION

A method and apparatus for creating and using temporary electronic bookmarks, such as those associated with a web browser, uses a digitizer tablet with an inking pen (or stylus). An end-user created symbol written on the tablet, in terms of Cartesian coordinates position, is associated contemporaneously with a specific electronically addressable site as a temporary label for the site's address. A set of created symbols is then used as a current index into a data structure that holds the associated value related to the web site, allowing the user to jump between annotated sites using the created symbols.

In its basic aspect, the present invention provides a computer annotator system including: an electronic tablet having visible marking capability; a marking stylus associated with the tablet; and a device for associating at least one temporarily marked location on said tablet with a preselected data address wherein subsequently accessing said marked location with said stylus triggers a shift to said data address associated with said marked location.

In another aspect, the present invention provides a method for indexing computer-accessible sites, the method including: accessing a first computer-accessible site; associating an address indicative of the first computer-accessible site with a first location coordinate address on a computer writing tablet via a visible marking a first random location on said writing tablet during access of said first computer-accessible site; accessing a second computer-accessible site; and associating an address indicative of the second computer-accessible site with a second location coordinate address on a computer writing tablet via a visible marking on a second random location on said writing tablet during access of said second computer-accessible site.

In another aspect, the present invention provides a method for using a computer writing tablet, the method including: associating an input-output port of the tablet with signals indicative of computer data addresses; when each of a plurality of computer data addresses is accessed, writing a mnemonic object associated therewith respectively, wherein a location on said tablet of the mnemonic object is coupled to a current one of said computer data addresses; and accessing any specific one of said plurality of computer data addresses by selecting the mnemonic object associated therewith.

In another aspect, the present invention provides a computerized method including: accessing an internet site; and associating an address of the site with a writable-erasable mnemonic device in a computer writing tablet.

In a further aspect, the present invention provides a computer memory including: computer code for recording temporary symbols; and computer code associating an address of preselected computer data with a writable-erasable mnemonic device in a computer writing tablet for receiving said temporary symbols.

In yet another aspect, the present invention provides an internet search tool including: an internet access device; in communication with the internet access device, a writing tablet and associated inking stylus; and associated with the combination of internet access device, writing tablet and stylus, program code using said tablet for generating bookmarks related to respective search resultant internet sites.

The foregoing summary is not intended to be an inclusive list of all the aspects, objects, advantages, and features of the present invention nor should any limitation on the scope of the invention be implied therefrom. This Summary is provided in accordance with the mandate of 37 C.F.R. 1.73 and M.P.E.P. 608.01(d) merely to apprise the public, and more especially those interested in the particular art to which the invention relates, of the nature of the invention in order to be of assistance in aiding ready understanding of the patent in future searches. Objects, features and advantages of the present invention will become apparent upon consideration of the following explanation and the accompanying drawings, in which like reference designations represent like features throughout the drawings.

The drawings referred to in this specification should be understood as not being drawn to scale except if specifically annotated.

DETAILED DESCRIPTION OF THE INVENTION

Reference is made now in detail to a specific embodiment of the present invention, which illustrates the best mode presently contemplated by the inventor for practicing the invention. Alternative embodiments are also briefly described as applicable.

Figure 2A:
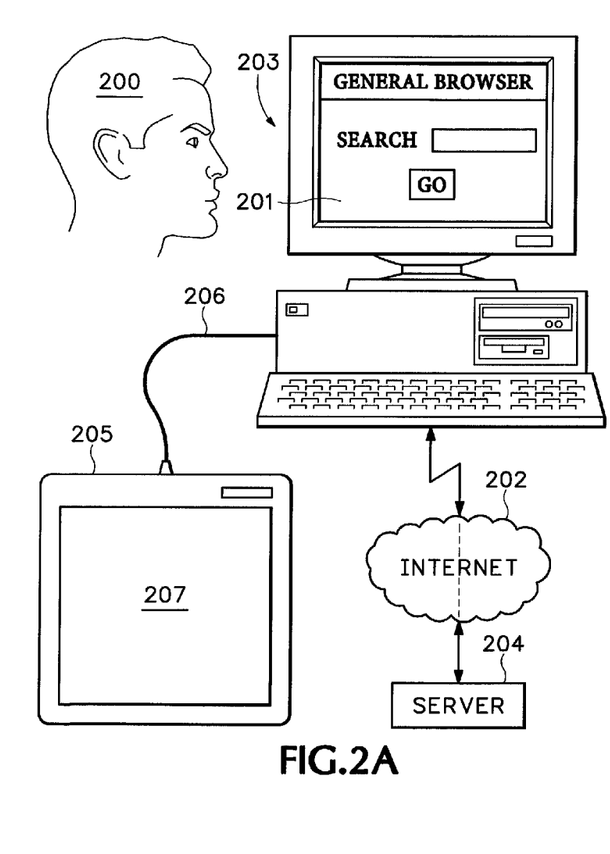
FIGS. 2A-2F is a series of schematic drawings illustrating the method and apparatus in accordance with the present invention.

Turning to FIG. 2A, the end-user 200 is depicted using a web browser 201 on a computer 203 (or other internet access device, e.g., WebTV™ device, internet-ready cell phone, or the like) coupled either by wire 206, or wireless, to a digitizer tablet 205 having a surface 207 on which pencil, pen, inking stylus, electronic ink device, writable-erasable electronic display (e.g, LCD type), or the like may be used to create a visible marking, or "symbol," on the surface. "Inking stylus" will be the term used generically hereinafter for any such device. One or more of the foregoing apparatus described in the Background hereinbefore, or the like, may be adapted for use with the present invention and used as said tablet 205. It is an advantage of the present invention that a sophisticated, high resolution, marking device and tablet is not required.

Figure 2B:
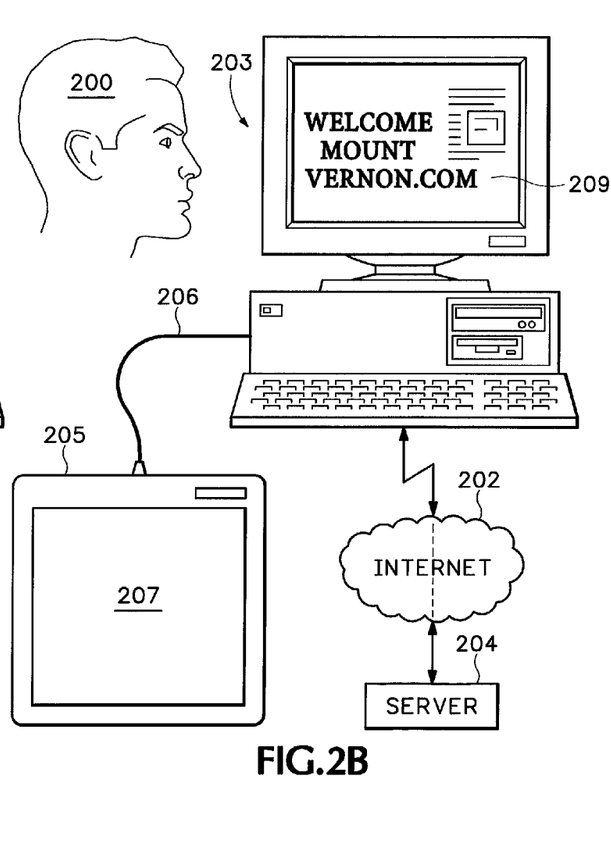

The user 200 uses the browser 201 to find web sites of interest over the internet 202. In a known manner, a search term, e.g. "U.S. Presidents," will provide a search results list from the server(s) 204 with which the browser 201 is in communication. As shown in FIG. 2B, an exemplary site related to the search subject is "mount_vernon.com" 209, selected and accessed in a known manner via the browser 201 from the search results.

Figure 2C:
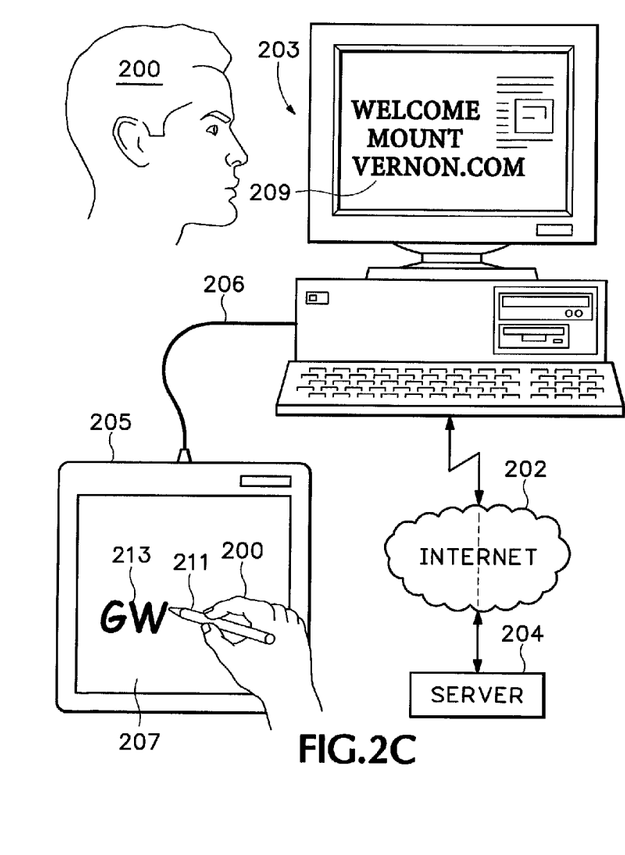

As depicted by FIG. 2C, using an inking stylus 211 associated with the tablet 205, the end-user 200 writes a symbol—in this example "GW"—or any other mnemonic hint 213 associated with the site on the writing surface 207. As a result of this action, the geometric coordinates of the visible mnemonic hint 213 become an index for the URL of the current web page—e.g., http://www.mount_vernon.com—in accordance with the present invention as described in more detail hereinafter.

Figure 2D:
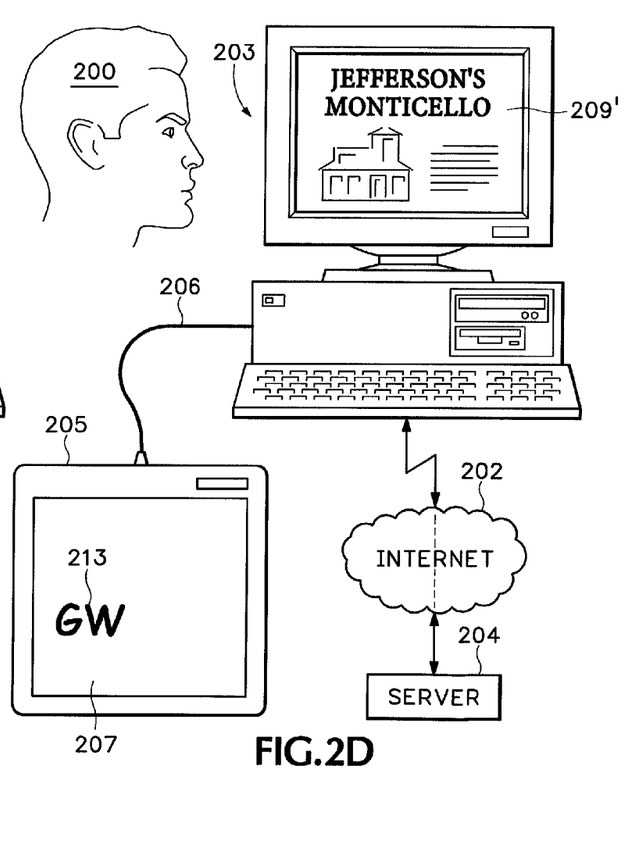
Figure 2E:
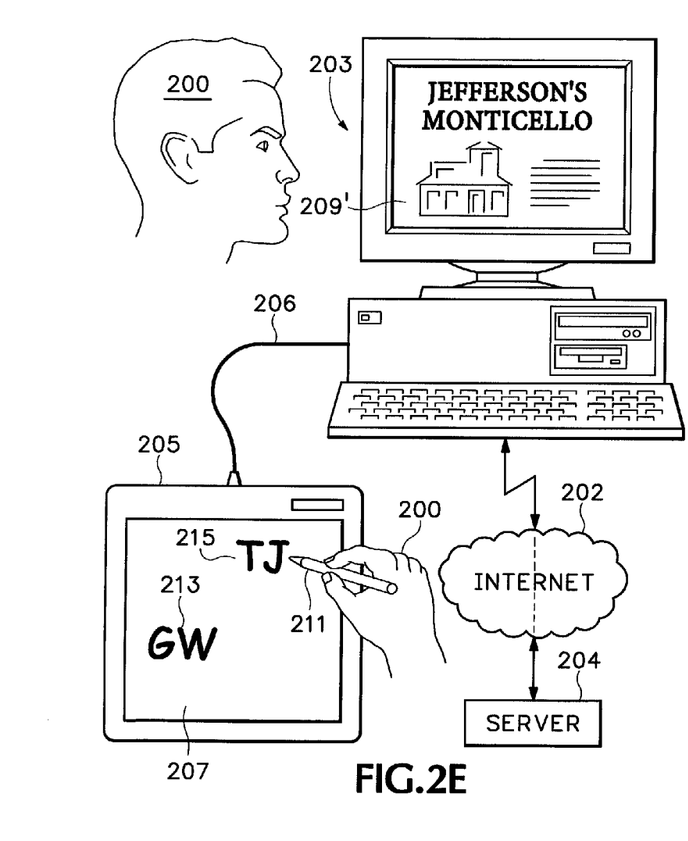

Turning to FIG. 2D, the user finds one or more other sites of interest; in continuing the U.S. Presidents exemplary search, e.g., http://www.monticello.org. As shown in FIG. 2E, using the stylus 211 again, the user writes a second mnemonic hint, "T J," 215 on another region of the tablet surface 207. The coordinates of this hint 215 on the surface 207 serves as the index for the Thomas Jefferson Monticello site 209' URL.

Figure 3:
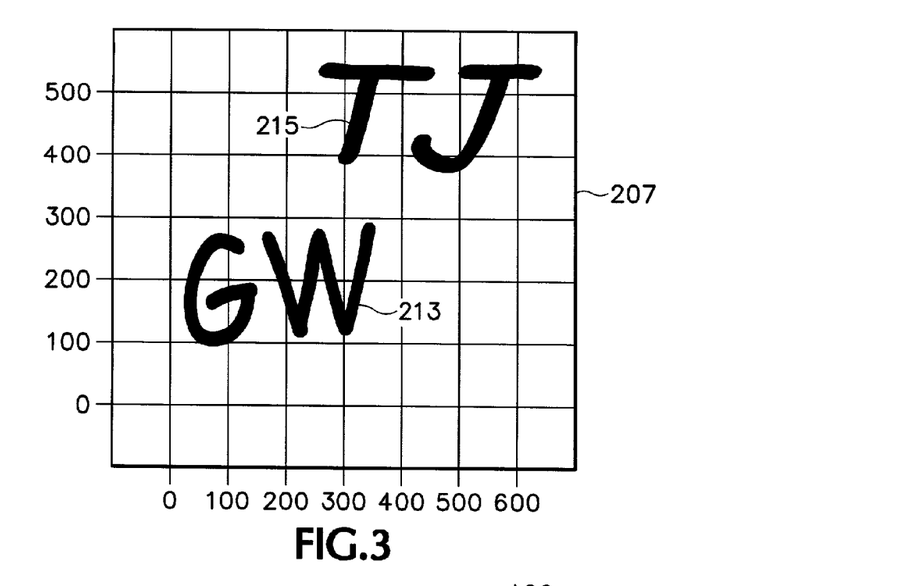
FIG. 3 is an exemplary tablet schematic as being used in accordance with the present invention as shown in FIGS. 2A-2F.
Figure 4A:
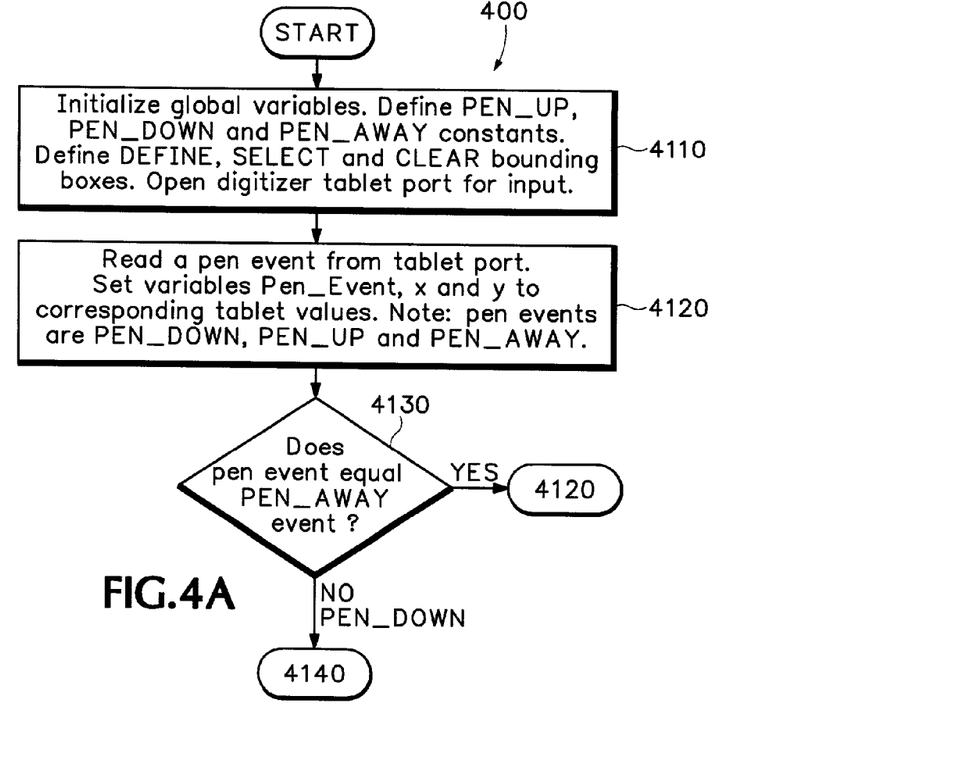
FIGS. 4A-4E is a flow chart of the software-firmware methodology in accordance with the present invention.
Figure 4B:
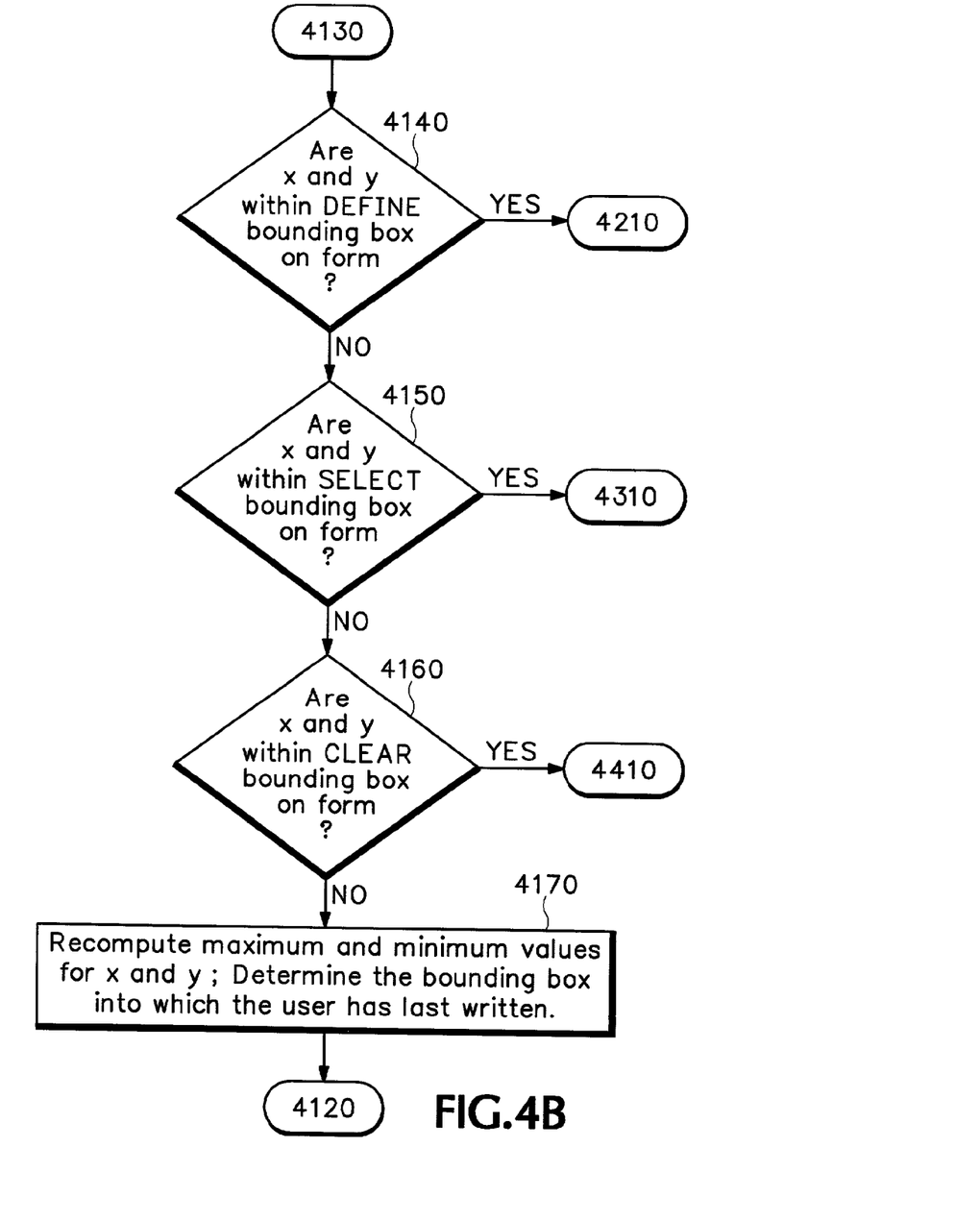
Figure 4C:
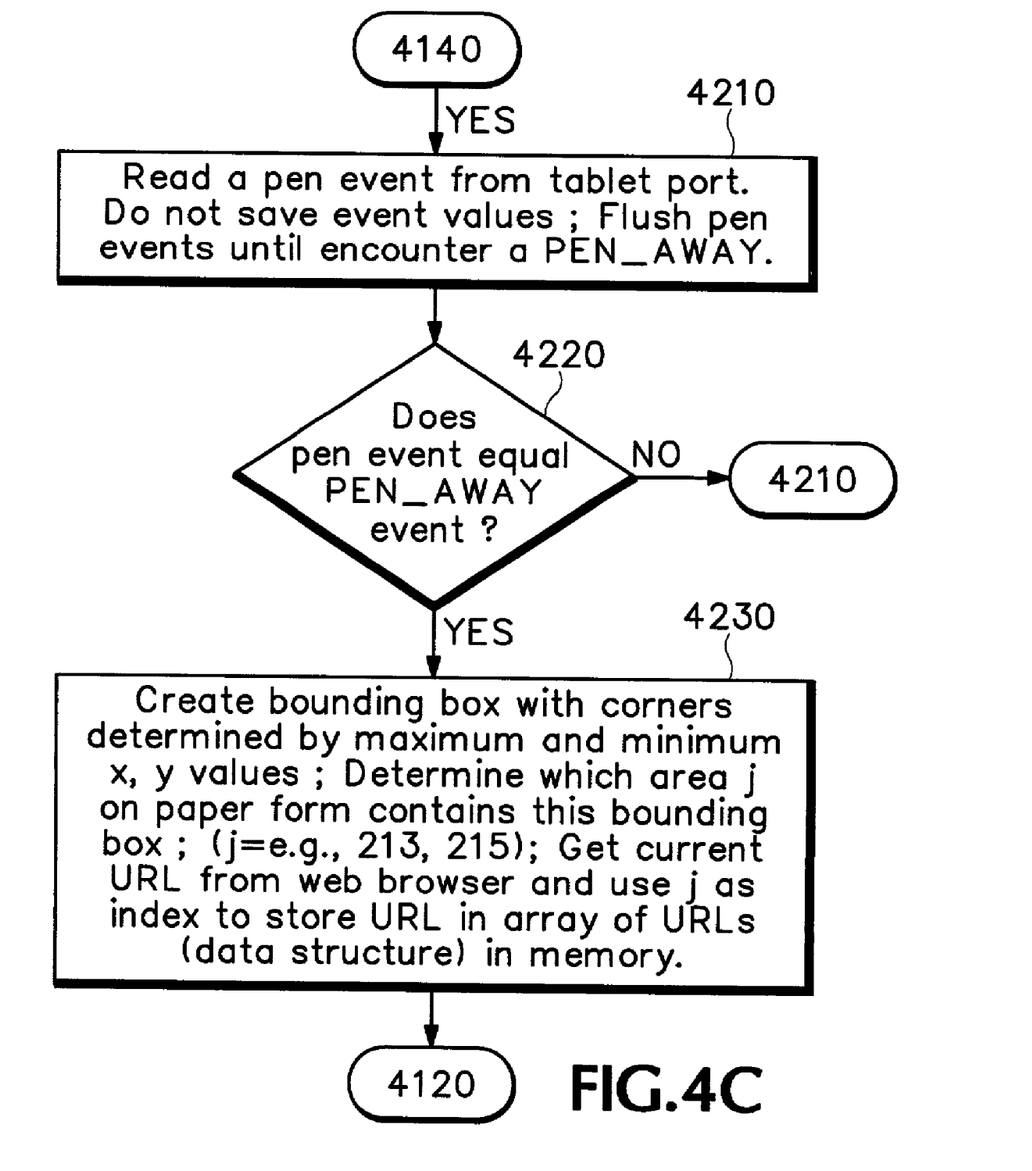
Figure 4D:
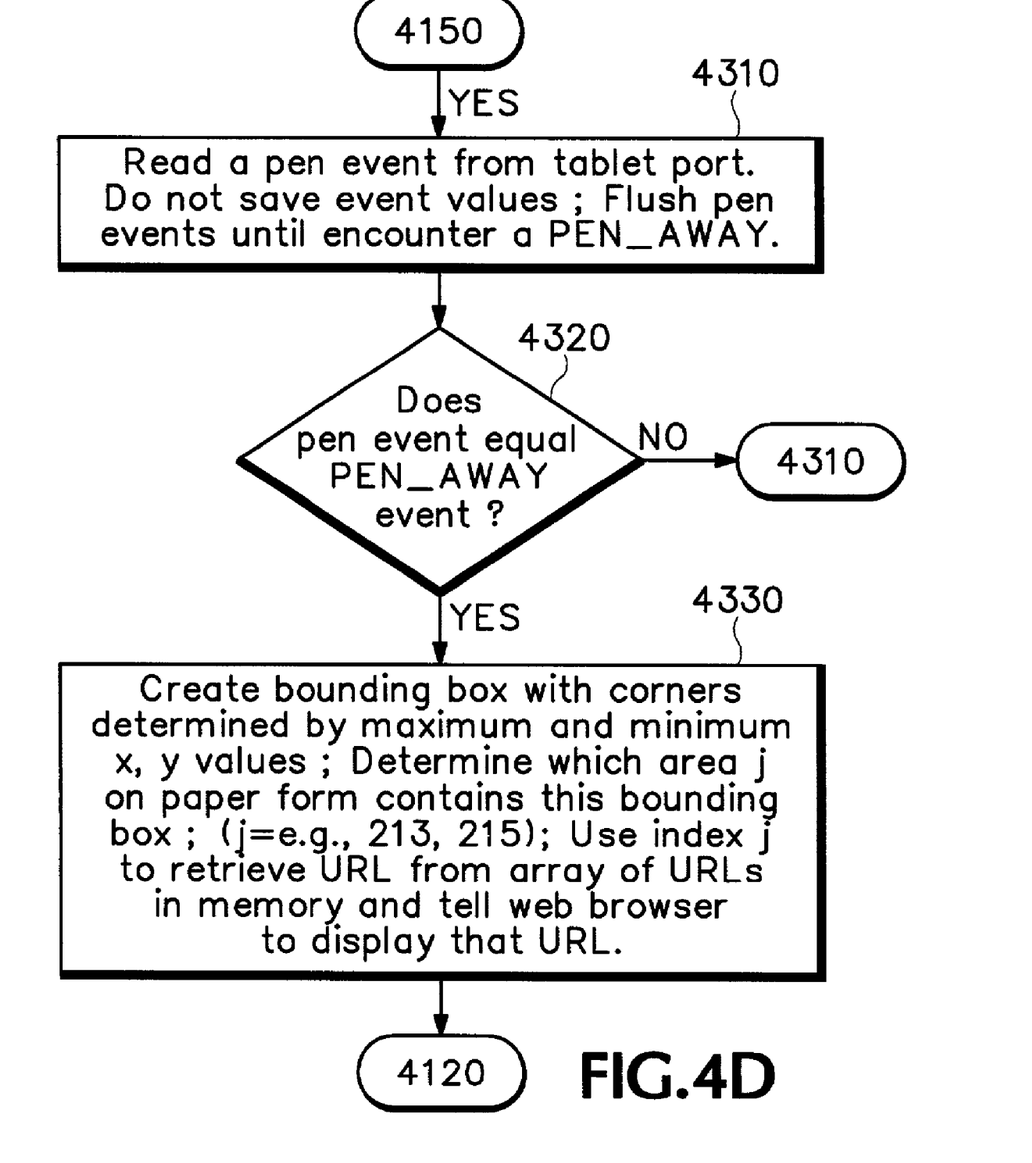
Figure 4E:
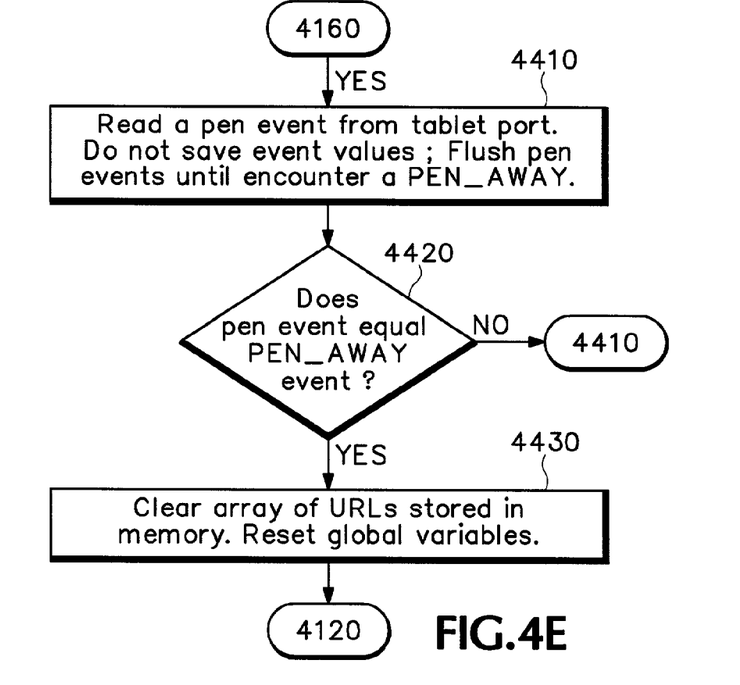

The indexing of the mnemonic hints 213, 215 is better understood with reference to FIG. 3. The surface 207 of the digitizer tablet can be defined as a coordinate system, e.g. a Cartesian coordinate grid. Each mnemonic hint location on the surface 207 can thus convey information independent of the individual semantic meaning of the hint. For example, the hint "GW" 213 is in a surface area bounded by coordinate set: 0,0+0,300+400,300+400,0 (or other data stream recognizable as a marked position)—viz., it forms a temporary bookmark—on the tablet surface 207. (Note that having the Cartesian coordinates origin 0,0 in the lower left hand corner of the tablet as shown in FIG. 3 is just one possible exemplary configuration. Other systems may be employed in accordance with the present invention.) This coordinate set can be used as an index into a data structure stored in the computer memory that holds the associated value associated with the mnemonic hint, viz., the web site URL for http://www.mount_vernon.com.

In operation, the user 200 uses the inking tablet 205 surface 207 to create visible mnemonic hints 213, 215 related to sites of interest from the session search results (note that one or more searches can be performed during the on-line session and hints added to the tablet 205 as long as separate surface 207 regions are written in; writing over a hint with would effectively erase the first indexed site, changing it to the currently viewed site). At any time during which a current mnemonic hint 213, 215 index is stored in memory, it can be tapped or clicked on and the computer will jump to the associated site. Sites visited but that are not of continuing interest, are merely not annotated on the tablet 205.

Figure 2F:
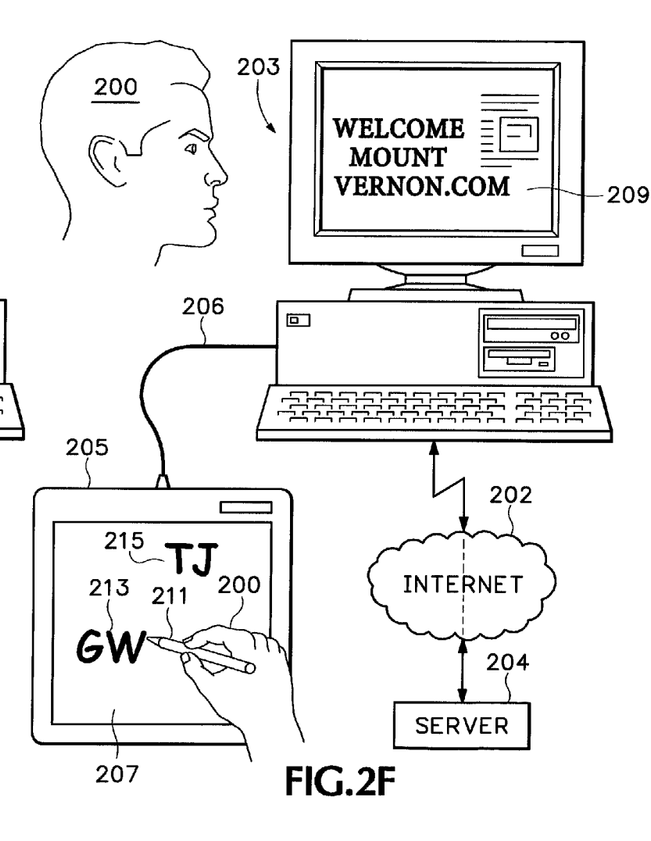

If the user, currently at the web site for Jefferson's Monticello as shown in FIG. 2E decides they wish to return to the Mount Vernon site, using the stylus 211 as shown in FIG. 2F, the user simply touches the "GW" mnemonic hint serving as the temporary bookmark for that URL. The web browser 201 (FIG. 2A only) is directed to jump back to the original web site 209 stored in association with the hint 213, viz., http://www.mount_vernon.com.

Figure 5:
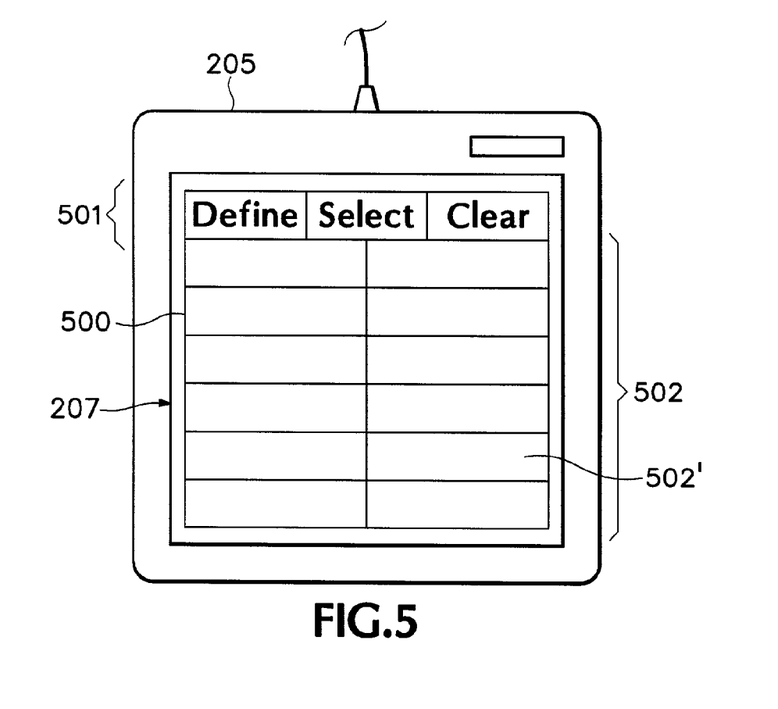
FIG. 5 is an optional predetermined form as might be used in accordance with the present invention as shown in FIGS. 2A-2F and 3.

In an alternative embodiment, the surface 207 is predefined with function regions 501 and user mnemonic symbol entry regions 502. An exemplary form 500 as shown in FIG. 5 is a temporary (tear off) or permanent overlay for the tablet 205 marking surface 207, providing fifteen predefined indexing regions: three for the functions DEFINE (or ENTER—for new hints), SELECT (or GO TO—for jumping between hints), CLEAR (or ERASE), and twelve mnemonic hint entry regions, or boxes, 502' for use during a current on-line session. This simplifies the algorithm required for relating the handwritten hint with a surface 207 position as the position of each box, and hence the mnemonic entered, is always a given regardless of which box 502' of the entry region 502 is used. Commercially available form control software can augment this alternative.

Turning now to FIGS. 4A-4E, a flowchart of an exemplary embodiment methodology 400 in accordance with the present invention. FIGS. 4A-4E is a flowchart demonstrating the process which can be implemented in software (e.g., onboard the computer) or firmware (on-board the tablet). The flowchart represents a process that is "event-driven;" i.e., it will continuously loop, waiting for another new "pen event" when no other computation is being carried out. Therefore, no "STOP" box is used.

A digitizing tablet generates a sequence of "pen events" which consist of an event code plus numeric values corresponding to the x-coordinate and y-coordinate of the pen. For example, commercially available tablets such as by Wacom, supra, have at least three event codes: PEN_DOWN, PEN_UP, and PEN_AWAY. To facilitate understanding of the exemplary embodiment of the present, these same code names are used. A PEN_DOWN event occurs when the pen actually touches the tablet surface. A PEN_UP event occurs when the pen is lifted to within some predefined threshold distance about the tablet and is moved across the tablet surface (e.g., the handwriting motion associated with crossing a "t" or dotting an "i"). A PEN_AWAY event occurs when the pen is lifted beyond the threshold distance.

The process 400 is initialized, step 4110, defining global variables as required per an specific implementation. Again, PEN_UP, PEN_DOWN and PEN_AWAY, collectively referred to as "pen events," are typical of stylus type devices. For the purpose of describing the basic embodiment, it is assumed that the preprinted tablet form 500 is employed; referring simultaneously to FIG. 5 will aid in understanding the process flow. When using a preprinted form such as shown in FIG. 5, defining function boxes, i.e., tablet surface regions, 501, such as DEFINE, SELECT, CLEAR, is provided. The tablet input-output port (I/O) is initialized. Whenever a pen event occurs, e.g., notation 213, 215 (FIG. 3), the event is read via the I/O port. Tablet surface 207 X and Y coordinates associated with the event are, at least temporarily, stored, step 4120.

When a PEN_AWAY event occurs, step 4130, Yes-path, the process loops back to await a new event. When the pen is in communication with the tablet surface 207, PEN_DOWN, step 4130, No-path, a determination is made, step 4140, whether the current X,Y coordinates are in the DEFINE region of function regions 501. If not, step 4140, No-path, the SELECT and CLEAR functions are checked for activation, steps 4150, 4160. Each function has a related subroutine—in this embodiment, starting steps 4210, 4310, 4410, respectively—for handling whatever functions have been built into the specific implementation.

Assuming the user is not in a function box 501, see step 4160, No-path, the maximum and minimum values of X, Y are computed, step 4170, determining the bounding box 502 of user define hints last entered. In other words, before looping back to the next pen event, step 4120, in step 4170, a runny tally of the minimum and maximum values of the X and Y coordinates is provided. No cache or buffer to retain all such points is required, only those four values which will determine the bounding box where the user has written. For example, at the point of the process 4160, NO-path, the user must be writing in one of the bounding boxes 502'. Therefore, only the location of the bounding box needs to be tracked. For example, if (x>maximum_x) then maximum_x=x;
if (y>maximum_y) then maximum_y=y;
if (x>minimum_x) then minimum_x=x;
if (y>minimum_y) then minimum_y=y.

These minimum and maximum values of X and Y are used in steps 4230 and 4240 when either the DEFINE or SELECT are selected, viz., 4140, Yes-path, and 4150, Yes-path, respectively.

If the user is in the DEFINE bounding box, step 4140, Yes-path, a next pen event is detected, and detection continued, i.e., the process loops, until a PEN_AWAY is encountered, steps 4210, 4220. Once the pen event is a PEN_AWAY, step 4220, Yes-path, registers the coordinates of a hint bounding box of the form 502 (or without the form creates a freeform bounding box with an area, "j," as shown in FIG. 3 and described hereinbefore). The bounding box is associated with the current URL from the web browser page, e.g. 209, 209', FIG. 2), step 4230. Thus, a new hint is stored.

If the user clicks activation in the SELECT bounding box, step 4150, Yes-path, a next pen event is detected, and detection continued, i.e., the process loops, until a PEN_AWAY is encountered, steps 4310, 4320. Once the pen event is a PEN_AWAY, step 4320, Yes-path, it is indicative that the user has selected a previously recorded hint (e.g., 213, 215, FIG. 2)

and the web browser is instructed to jump to the previously associated URL (see steps 4210-4230), step 4330.

If the user is in the CLEAR bounding box, step 4160, Yes-path, a next pen event is detected, and detection continued, i.e., the process loops, until a PEN_AWAY is encountered, steps 4410, 4420. Once the pen event is a PEN_AWAY, step 4420, Yes-path, memory is cleared, step 4430, of previously recorded hints (see steps 4210-4230). The tablet surface 207 is again free to start a new session.

Note that with tablet implementations using actual tear-off paper sheets for annotating mnemonic hints, the paper can still be kept as a record or reminder of the on-line session.

Note that it is specifically intended that the method and apparatus herein described can be used with any other software besides a browser which uses an addressing scheme to jump between indexed locations. For example, a library may develop a proprietary search program, or the like. That is, in addition for being used in association with Internet URI addresses, the computer annotator system just described is suitable for adaptation to temporarily associating any computer data that is addressable at a predefined address with a written mnemonic hint created by the user on the tablet surface. The following are some other examples.

Mnemonic hints can be associated with any of the following entities for the purpose of selecting or accessing:
(1) a cell in a spreadsheet,
(2) a voice mail message,
(3) an e.mail message,
(4) a song on a digital player,
(5) a video selection or specific frame locations thereof on a digital video drive,
(6) a video selection or specific frame locations thereof on a digital recorder-player (e.g., TiVo™ or the like),
(7) a video selection or specific frame location thereof on a streaming video player (e.g., RealPlayer™ or the like).

For spreadsheets, the association is made to the cell index. For e.mail and voicemail selection, the link is made to the message index. For music and video playback, the association is to the desired track (elapsed time within each track also could be used as an index).

It is commonplace to video tape business meetings, legal proceedings and the like. The resulting video is converted to a format such as streaming video and made available from a server. Using a unit in accordance with the present invention, marks on the tablet during the taped session could designate segments of specific interest. Playback is then facilitated by using the mnemonic hints to access directly to those points of specific interest.

Note also that the present invention can be adapted for using a stylus capable personal digital assistant (PDA) into a temporary bookmarking annotator.

The foregoing description of the preferred embodiment of the present invention has been presented for purposes of illustration and description. It is not intended to be exhaustive or to limit the invention to the precise form or to exemplary embodiments disclosed. Obviously, many modifications and variations will be apparent to practitioners skilled in this art. Similarly, any process steps described might be interchangeable with other steps in order to achieve the same result. The embodiment was chosen and described in order to best explain the principles of the invention and its best mode practical application, thereby to enable others skilled in the art to understand the invention for various embodiments and with various modifications as are suited to the particular use or implementation contemplated. It is intended that the scope of the invention be defined by the claims appended hereto and their equivalents. Reference to an element in the singular is not intended to mean "one and only one" unless explicitly so stated, but rather means "one or more." Moreover, no element, component, nor method step in the present disclosure is intended to be dedicated to the public regardless of whether the element, component, or method step is explicitly recited in the following claims. No claim element herein is to be construed under the provisions of 35 U.S.C. Sec. 112, sixth paragraph, unless the element is expressly recited using the phrase "means for . . . " and no process step herein is to be construed under those provisions unless the step or steps are expressly recited using the phrase "comprising the step(s) of. . . ."

What is claimed is:

1. A computer annotator system for accessing Internet data addresses, the system comprising:
   an electronic tablet having a screen with plural predefined regions that receive handwritten mnemonic symbols at random locations on the electronic tablet, the handwritten mnemonic symbols are hints for different Internet data addresses, and geometric coordinates of the handwritten mnemonic symbols on the electronic tablet become indexes of the Internet data addresses;
   a marking stylus associated with the tablet;
   a device for associating the handwritten mnemonic symbols at the random locations on the plural predefined regions with the Internet data addresses, wherein subsequently accessing one of the handwritten mnemonic symbols on the predefined regions with said stylus triggers a shift, on a display separate from the tablet, to one of said Internet data addresses associated with the one of the handwritten mnemonic symbol in the one of the predefined regions.

2. The system as set forth in claim 1 comprising:
   clicking on the one of the handwritten mnemonic symbols to navigate to the one of the Internet data addresses.

3. The system as set forth in claim 2 comprising:
   said tablet having at least one predetermined second surface region accessible to said stylus wherein freehand symbols indicative of the preselected data address are entered.

4. A method for indexing computer-accessible Internet sites, the method comprising:
   accessing a first of said sites with an electronic device;
   associating an address indicative of the first of said sites with a first location coordinate address on a computer writing tablet, separate from said electronic device, via a first handwritten mnemonic symbol that is a user recognizable hint for the first of said sites, the hint for the first of said sites being on a first random location on said writing tablet during access of said first of said sites;
   accessing a second of said sites; and
   associating an address indicative of the second of said sites with a second location coordinate address on the computer writing tablet via a second handwritten mnemonic symbol that is a user recognizable hint for the second of said sites, the hint for the second of said sites being on a second random location on said writing tablet during access of said second of said sites.

5. The method as set forth in claim 4 further comprising:
   continuing said method for a plurality of computer-accessible internet sites other than said first and said second as long as there is available space for further handwritten mnemonic symbols.

6. A method as set forth in claim 4 comprising:
erasing a said handwritten mnemonic symbol on said writing tablet after a last access to an associated address indicative of a computer-accessible internet site.

7. A method for using a computer writing tablet, the method comprising:
associating an input-output port of the computer writing tablet with signals indicative of Internet-associated computer data addresses;
when each of a plurality of the Internet-associated computer data addresses is accessed on a computer separate from the computer writing tablet, writing a mnemonic object at a random location on said computer writing tablet, wherein the random location on said computer writing tablet of the mnemonic object becomes an index of an Internet address and the random location is coupled to a current one of said Internet-associated computer data addresses and said mnemonic object is handwritten and a user recognizable hint for the current one of said Internet-associated computer data addresses such that clicking on the mnemonic object navigates the computer to the Internet address; and
accessing any specific one of said plurality of the Internet-associated computer data addresses by selecting the mnemonic object associated therewith.

8. The method as set forth in claim 7 comprising:
predefining specific locations on said computer writing tablet with data indexing functions.

9. The method as set forth in claim 8 comprising:
erasing each said mnemonic object for disassociating a location from the current one of said computer data addresses associated therewith.

10. A computerized method comprising:
accessing an internet site with an electronic device;
receiving a handwritten symbol for the internet site at a random location on a screen of a computer writing tablet that is separate from the electronic device, the handwritten symbol being a user recognizable hint for the internet site;
creating an index of a Uniform Resource Locator (URL) for the internet site from geometric coordinates of the handwritten symbol at the random location on the screen; and
selecting the handwritten symbol at the geometric coordinates on the screen of the computer writing tablet to cause the electronic device to navigate to the internet site.

11. The method as set forth in claim 10 comprising:
providing writing tablet function keys on said computer writing tablet.

12. The method as set forth in claim 10 comprising:
defining the screen as a coordinate system with plural locations, each location being a temporary bookmark for an internet site.

13. The method as set forth in claim 10 comprising:
automatically alternating access between a plurality of addresses accessed and associated with mnemonic devices by alternating current selection between said mnemonic devices with a writing tablet writing instrument.

14. An internet search tool comprising:
an internet access device;
in communication with the internet access device, a writing digitizer tablet and associated inking stylus; and
associated with the combination of internet access device, writing digitizer tablet and stylus, program code using said digitizer tablet for generating bookmarks thereon related to respective search resultant internet sites such that said sites are accessible directly via said bookmarks, wherein each of said bookmarks is a handwritten mnemonic hint at a random location on a screen of the writing digitizer tablet, the handwritten mnemonic hint is user recognizable as a previously selected internet site address such that clicking on the bookmarks navigates the internet access device to the resultant internet sites.

15. The tool as set forth in claim 14 wherein each of said bookmarks is located in a coordinate system on a screen of the digitizer tablet.

16. The tool as set forth in claim 14 wherein each of said bookmarks is a temporary representation of coordinates on said writing digitizer tablet.

17. The tool as set forth in claim 16 wherein each of said bookmarks activates a jump from a current internet site address to an internet site associated with another selected one of said bookmarks.

* * * * *